(12) United States Patent
Sherman, II

(10) Patent No.: US 7,337,881 B1
(45) Date of Patent: Mar. 4, 2008

(54) FULL FLOAT MULTI-FORCE CALIPER ASSEMBLY

(75) Inventor: William E. Sherman, II, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 11/161,291

(22) Filed: Jul. 28, 2005

(51) Int. Cl.
*F16D 55/18* (2006.01)

(52) U.S. Cl. .................. 188/72.4; 188/73.45

(58) Field of Classification Search .......... 188/72.4, 188/73.45, 72.5, 73.1, 73.44
See application file for complete search history.

(56) References Cited

U.S. PATENT DOCUMENTS

| | | | | |
|---|---|---|---|---|
| 3,734,248 A | * | 5/1973 | Fay | 188/345 |
| 4,027,750 A | * | 6/1977 | Kawamoto et al. | 188/73.45 |
| 4,082,167 A | * | 4/1978 | Einchcombe et al. | 188/73.34 |
| 4,313,526 A | * | 2/1982 | Farr | 188/72.4 |
| 4,331,221 A | * | 5/1982 | Evans et al. | 188/73.44 |
| 4,603,761 A | * | 8/1986 | Bernd-Holger | 188/73.45 |
| 5,749,445 A | * | 5/1998 | Ruiz Busquets | 188/73.45 |
| 5,810,122 A | | 9/1998 | Deit et al. | |
| 6,161,658 A | * | 12/2000 | Becocci | 188/71.8 |

* cited by examiner

*Primary Examiner*—Pam Rodriguez
(74) *Attorney, Agent, or Firm*—Leo H. McCormick, Jr.; Sarah Taylor

(57) ABSTRACT

A disc brake having a caliper straddling a rotor; a fixed carrier, an actuator comprising a primary cylinder located in the caliper and closed by a piston; a guide arrangement including first and second pins for allowing the caliper to slide relative to the carrier on actuation, the first and second pins have a bound end fixed to the caliper and a free end respectively retained in first and second bores in the carrier by annular roll-back seals to define first and second auxiliary or secondary hydraulic cylinders. Inboard and outboard friction pads are positioned on opposite faces of the rotor by the piston and the caliper. In operation, the caliper, cylinder, and outboard brake pad are hydraulically moved to engage the outboard brake pad with the rotor while the primary cylinder hydraulically moves the inboard brake pad into engagement with the rotor to effect a brake application.

7 Claims, 2 Drawing Sheets

FULL FLOAT MULTI-FORCE CALIPER ASSEMBLY

The present invention relates to vehicle disc brake assemblies and in particular to an improved structure employing hydraulic axial translation of a brake caliper that augments the usual braking force induced caliper motion.

BACKGROUND OF THE INVENTION

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. Structures for actuating such drum brake assemblies and disc brake assemblies are well known in the art as illustrated in U.S. Pat. No. 5,810,122.

A typical disc brake assembly includes an anchor bracket or similar support member carrier that is secured to a fixed, non-rotatable component of the vehicle. A pair of brake pads are supported on the anchor bracket by a disc straddling caliper for sliding movement relative to the anchor bracket. The brake pads have respective friction surfaces that are located on opposite sides of a brake rotor. The rotor, in turn, is connected to and rotatable with the wheel of the vehicle. To effect braking action, the brake pads are moved inwardly toward one another so as to frictionally engage the opposed sides of the brake rotor. Such frictional engagement causes retarding or stopping of the rotational movement of the brake rotor and, therefore, the wheel of the vehicle in a controlled manner. In the disc brake assembly a caliper selectively moves the friction pads into frictional engagement with the brake rotor. The caliper assembly typically includes guide pins or other components to slidably support the caliper housing relative to the fixed anchor bracket. The caliper housing is generally C-shaped, having an inboard leg adjacent the inboard brake pad and an outboard leg adjacent the outboard brake pad. One or more hydraulically or pneumatically actuated brake pistons are provided in respective cylindrical recesses. Early caliper brakes employed pistons in both the inboard and outboard portions of the caliper to actuate inboard and outboard brake pads respectively. More recently, one or more pistons are located to one side of the disc, typically in the inboard leg of the caliper adjacent to the inboard brake pad. In these more recent arrangements, when the brake pedal is depressed, the piston and the inboard leg of the caliper are urged apart from one another so that the piston and inboard friction pad are urged axially outwardly, while the outboard leg of the caliper and outboard friction pad are urged inwardly. The piston is disposed adjacent to the inboard brake pad and, therefore, urges it outwardly toward the inner side of the rotor. Because the caliper is slidably mounted on the pins of the anchor bracket, the outboard leg of the caliper and outboard brake pad are urged inwardly toward the outer side of the rotor. As result, the brake pads frictionally engage the opposed sides of the rotor. With this arrangement, the inboard friction pad needs to engage the disc or a similar impediment before outboard friction pad can begin to move toward the disc. When the pressure applied by the piston is released, a resilient annular roll-back piston seal serves to retract the piston to an initial position. Additional brake pad retraction springs may also be employed, such brakes are often called "sliding-caliper brakes" and are well known in the prior art.

In order to reliably obtain the braking force from the disc brake system having the guide pin type guide, the guide pin is required to smoothly slide in the guide hole in the direction perpendicular to the disc. Lubrication for the pins would be desirable. It would also be desirable to have a more positive and reliable translation of the caliper along the pins. Further, it would be desirable to eliminate the need for brake pad retraction springs.

SUMMARY OF THE INVENTION

The present invention provides guide pin lubrication, reliable positive motion and the desired inboard and outboard running clearances between friction pads and the disc without a need for brake pad retraction springs.

In more detail, a disc brake according to the present invention has a caliper that straddles a brake disc or rotor and is supported by a fixed carrier or anchor. Fluid braking pressure is supplied by a hydraulic path including a selectively operable hydraulic pressure source, a primary hydraulic cylinder secured to the caliper and closed by a piston, and hydraulic fluid conduits coupling the source to the cylinder. A guide arrangement allows the caliper to slide relative to the carrier when the brakes are actuated and includes first and second identical cylindrical guide pins parallel to each other and each having a bound end fixed to the caliper, and a free end. There are first and second housings at least partially formed by first and second respective bores made in the carrier and in which the first and second guide pins respectively slide. Two friction pads pointing towards opposite faces of the disc are trapped between the piston and the caliper to be applied to the disc when the fluid braking pressure is actuated. An additional pair of hydraulic cylinders, one formed in each of the housings, and a pair of annular hydraulic seals, each disposed within a hydraulic cylinder about one of the guide pins intermediate the free and bound ends thereof to form a hydraulic seal between a guide pin and the sidewall of the corresponding hydraulic cylinder. The hydraulic fluid conduits which couple the source to the primary cylinder include a portion for coupling the source with the additional or secondary pair of hydraulic cylinders which may include a pair of generally axially extending fluid passageways, one in each guide pin one of which may also function to couple the primary cylinder to the hydraulic source. The pair of annular hydraulic seals may comprise resilient annular roll-back seals.

An advantage of the present invention resides in a hydraulic brake line that is connected directly to a relatively fixed anchor bracket rather than to the caliper and, therefore, is not subject to repeated flexing as the caliper slides.

Another advantage is that the present invention allows the use of larger and more rigid guide pins.

A further advantage is that the primary piston seal provides inner pad retraction upon cessation of braking while the guide pin seals provides outer pad retraction.

Yet another advantage is the fact that the guide pins are lubricated by brake fluid.

A still further advantage of the present invention is that the guide pin piston arrangement can augment the force effect of the conventional brake piston.

Another advantage of the present invention is that either external brake fluid passages, machined internal passages or a combination thereof may be employed.

Yet another advantage of this invention resides in a reduction of natural vibration harmonics resulting from an additional clamp load at the guide pins.

BRIEF DESCRIPTION OF THE DRAWINGS

Corresponding reference characters indicate corresponding parts throughout the several drawing views while modified analogous parts bear reference characters differing by one-hundred, e.g., 12 and 112.

DETAILED DESCRIPTION OF THE INVENTION

Figure 1:
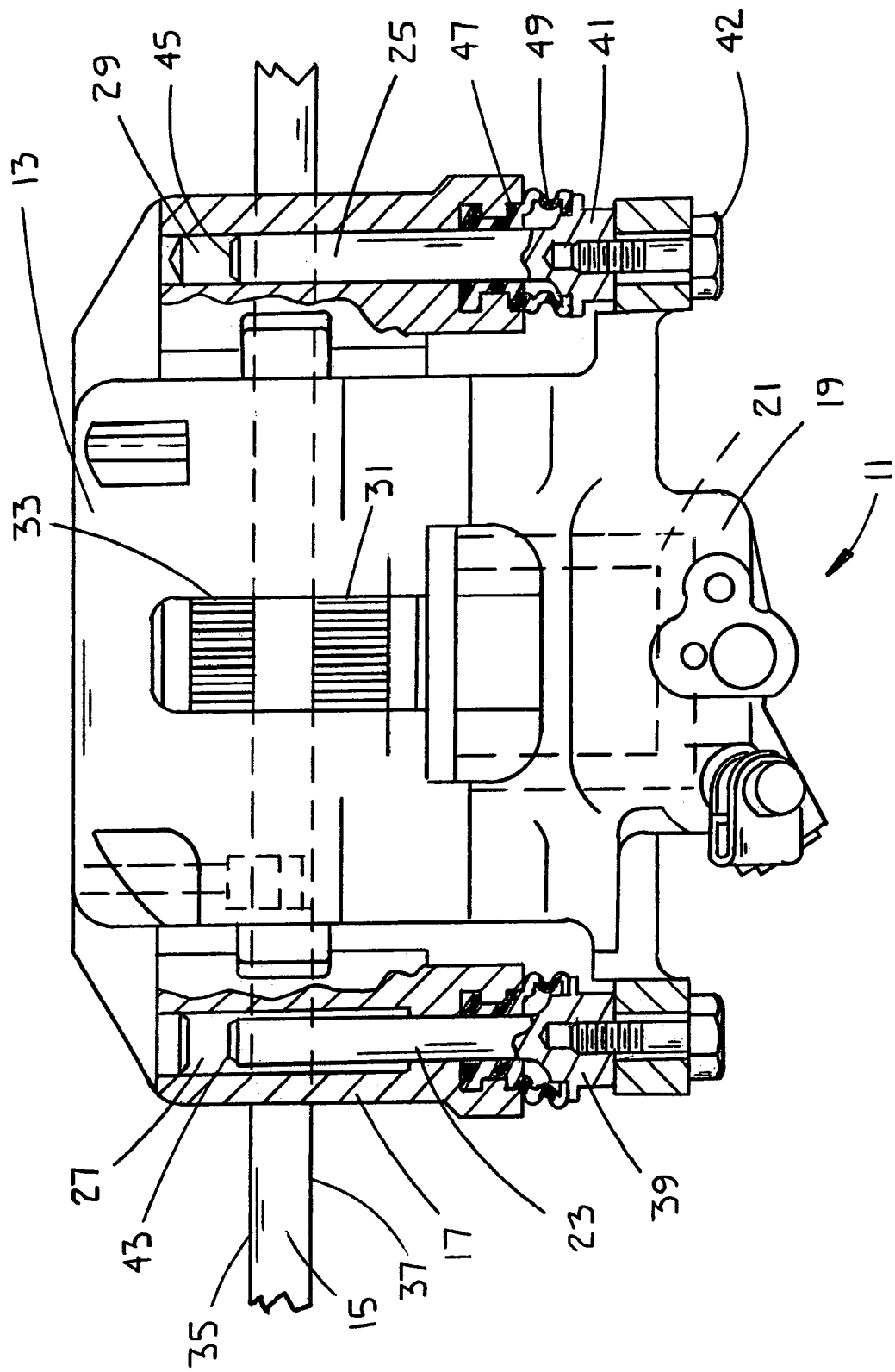
FIG. 1 is a partial sectional view of a prior art brake into which the present invention may be incorporated.

A disc brake 11 for a motor vehicle is illustrated in FIG. 1 as comprising: a caliper 13 that straddles a brake disc 15; a carrier 17 that is fixed to the vehicle; actuation means including a cylinder 19 secured to the caliper and closed by a piston 21; guide means including pins 23 and 25 and bores 27 and 29 whereby the caliper 13 may slide relative to the carrier 17 when the actuation means are actuated; and a first friction pad 31 and a second friction pad 33 that are aligned with opposite braking surfaces or faces 35, 37 of the disc 15. The first 31 and second 33 friction pads are retained between the piston 21 and the caliper 13 and are applied to the disc 15 when the actuation means are actuated to effect a brake actuation.

The first and second cylindrical guide pins 23, 25 of the guide means are parallel to each other and each having a bound end 39, 41 fixed to the caliper by bolts such as 42 such that a free end 43, 45, is cantilevered with respect to the fixed end in first and second housings partially formed by first and second respective bores 27, 29 made in the carrier 17, in which the first and second guide pins respectively slide. It is possible to reverse the roles of the guide pins and bores, supporting the pins on the carrier and forming the housings in the caliper, however, the illustrated arrangement is used in the prior art. The bores may also include rings such as 47 of electrometric material that assist in centering the guide pins, to assist in an optimum positioning and to damp out vibration of the caliper. In order to prevent dirt, moisture, or rust problems that could cause the caliper to "hang up" rather than translate freely along the pins boots 49 cover the pins. Additional features not necessary to an understanding of the present invention are more completely described in U.S. Pat. No. 5,810,122

While not shown in FIG. 1, frequently, an annular retraction or roll-back seal 75 (FIG. 2) is provided within the cylindrical recess in contact with the outer surface of the piston 21. The roll-back seal 75 is conventional in the art and performs several functions. First, the roll-back seal provides a seal to define the extent of the cylindrical recess or chamber within which the piston 21 is disposed. Second, the roll-back seal 75 is designed to retract the piston 21 inwardly away from the rotor 15 by a predetermined distance from the fully engaged position when the brake pedal is released after being depressed to define a running clearance between the friction pads 31, 33 and rotor 15. To accomplish this, the roll-back seal 75 frictionally engages the outer surface of the piston 21, to resiliently resist movement thereof when the brake pedal is depressed and pressurized fluid is supplied to actuation chamber 20. Thus, when the brake pedal is released by the operator of the vehicle, the resilience of the roll-back seal causes the piston 21 to retract within the cylindrical recess and out of contact with the inboard brake pad 31. In the present invention, a similar principle is employed with the pin seals 77 and 79 to enhance the retraction of the friction pads 31, 33 with respect to the rotor 15 per the present invention.

Figure 2:
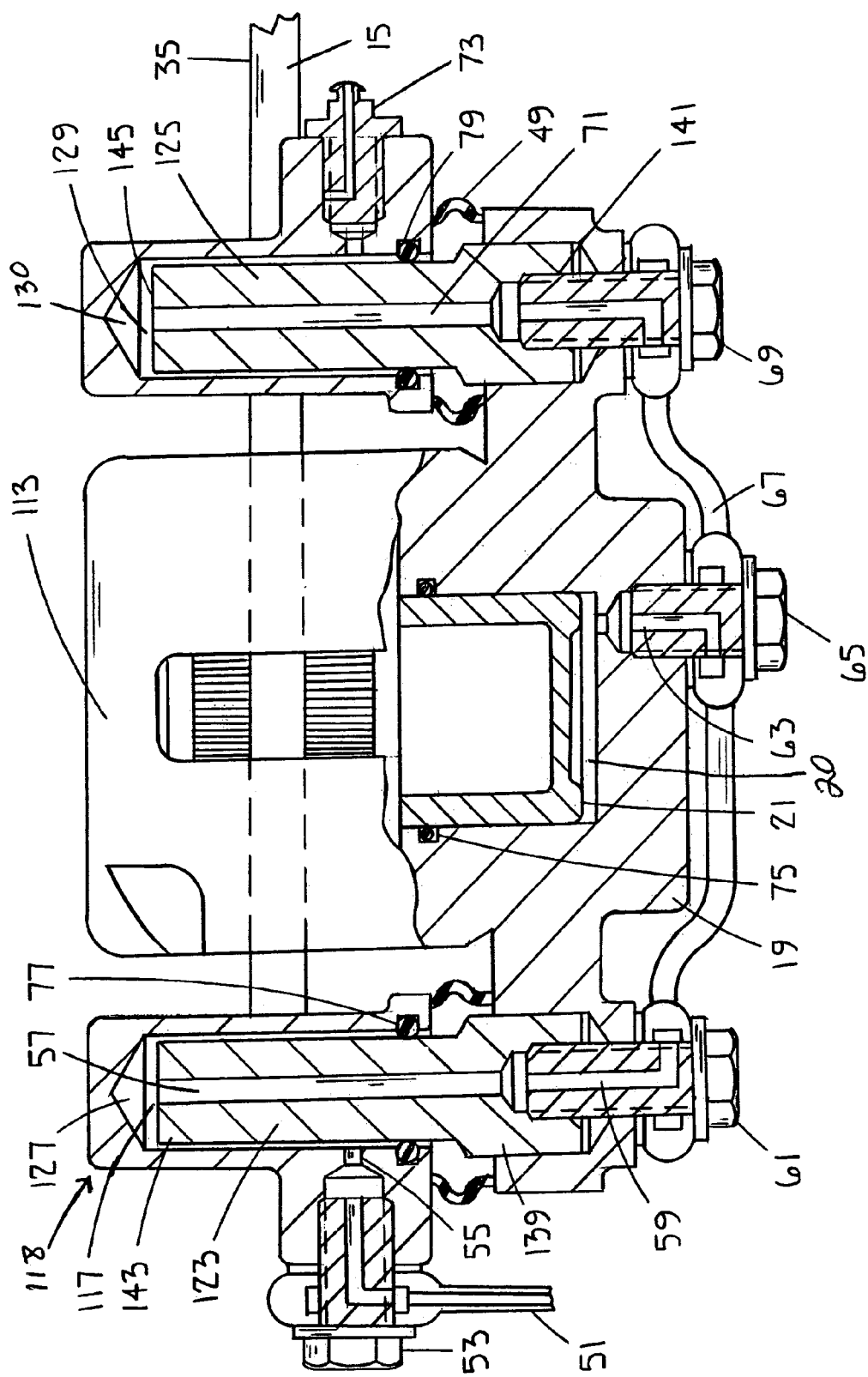
FIG. 2 is a partial sectional view of a brake similar to the brake of FIG. 1 in accordance with the invention.

Comparing FIGS. 1 and 2, components which provide substantially the same function have like reference numerals while components which have been modified to provide a different or additional function according to the present invention are identified by reference numerals which differ by one-hundred, e.g., 13 and 113 identify the brake calipers which function somewhat differently in the two figures. In FIG. 2, the anchor bracket or carrier 118 has been modified by the inclusion of the bores 127 and 129 that are closed at the upper ends and annularly grooved inside to receive roll-back pin seals 77 and 79 that engage the guide pins 123 and 125 to form secondary or supplemental hydraulic cylinders. The guide pins 123, 125 have been modified to include axial passageways 57 and 71 that extend from the free ends 143 and 145 to the bound ends 139 and 141 and function as hydraulic fluid path passages. The hydraulic path for actuating the piston 21 that was implied by the dash lines in FIG. 1 is set forth in FIG. 2 and include a series of banjo bolts 53, 61, 65, 69 and 73 of known design to provide fluid connections to several of the components and function as a portion of the hydraulic fluid path coupling the source of fluid with the primary cylinder of piston 21 and the additional pair of hydraulic cylinders defined by the pins 123 and 125 respectively located in bores 127, 129. More specifically, the fluid path for this disc brake includes conduit 51 which connects by way of banjo bolt 53 and anchor bracket conduit 55 to the hydraulic cylinder 117 of pin 123. From that cylinder, the generally axially extending fluid passageway 57 is connect to passage 59 in banjo bolt 61 and, by way of the external fluid passage, to banjo bolt 65. From here, fluid may be supplied to the primary brake cylinder through passage 63. Banjo bolt 65 is also connected by another external fluid passage 67 to banjo bolt 69 to supply hydraulic pressure through the axially extending fluid passageway 71 to the supplementary or secondary cylinder 129 of pin 125. It is understood that banjo bolt 73 may function as a bleed screw to remove air from the hydraulic system. The inlet ports for bolts 53 and 73 could be reversed to provide both right and left hand caliper structures if desired. It is possible to utilize one of the other banjo bolts such as 61 as the hydraulic pressure source connection thereby reducing the number of parts employed, but the advantage of not subjecting the hydraulic hose to repeated flexing as the caliper slides may be sacrificed. Conventional compression seals and washers may be employed as known in the art.

In operation, a vehicle operator initiates braking by enabling the hydraulic pressure source and pressure begins to build in the primary hydraulic cylinder 19 and secondary hydraulic cylinders 117 and 130. The caliper 113, cylinder 19, and the outboard brake pad are hydraulically moved axially relative to the carrier 17 to engage the outboard brake pad with an outboard face 35 of the disc and the inboard brake pad is hydraulically moved axially relative to the caliper to engage the inboard brake pad with an inboard face 37 of the disc. Upon removal of hydraulic pressure, the caliper, cylinder, and outboard brake pad are resiliently moved axially relative to the carrier to space the outboard brake pad from the outboard face of the disc and the inboard brake pad is resiliently moved axially relative to the caliper to space the inboard brake pad from the inboard face of the disc by the respective roll-backs seals.

What is claimed is:

1. A disc brake comprising:
a caliper that straddles a brake disc;
a fixed carrier;
actuation means comprising a hydraulic path for a selectively operable hydraulic pressure source, a hydraulic cylinder secured to said caliper and closed by a piston, and hydraulic fluid conduits coupling the source to the cylinder;
guide means for allowing said caliper to slide relative to the carrier when the actuation means are actuated, said guide means including first and second identical cylindrical guide pins that are parallel to each other and each having a bound end fixed to one of said caliper and said carrier, and a free end;
first and second housings at least partially formed by first and second respective bores located in one of said caliper and said carrier and in which the first and second guide pins respectively slide,
first and second friction pads located on opposite sides of the disc and retained between the piston and the caliper, said first and second friction pads being applied to the disc when the actuation means are actuated, characterized by an additional pair of hydraulic cylinders, one of which is formed in each of said housings, and a pair of annular hydraulic seals, each disposed within a hydraulic cylinder about one of said guide pins intermediate the free and bound ends thereof to form a hydraulic seal between a guide pin and the sidewall of the corresponding hydraulic cylinder, the hydraulic fluid conduits including a portion for coupling the source with the additional pair of hydraulic cylinders.

2. The disc brake according to claim 1, characterized in that said additional pair of hydraulic cylinders and the corresponding first and second housings are fixed relative to the carrier and the first and second guide pins and their associated seals are fixed relative to and movable with the caliper.

3. The disc brake according to claim 1, characterized in that said portion of the hydraulic fluid conduits for coupling the source with the additional pair of hydraulic cylinders includes a pair of generally axially extending fluid passageways, one in each guide pin.

4. The disc brake according to claim 1, characterized in that said hydraulic fluid conduits coupling the source to the cylinder include a generally axially extending fluid passageway in one of the guide pins.

5. The disc brake according to claim 1, characterized in that said pair of annular hydraulic seals comprise resilient annular roll-back seals.

6. The disc brake according to claim 1, characterized in that said additional pair of hydraulic cylinders and the corresponding first and second housings are fixed relative to the carrier and said first and second guide pins and their associated seals are fixed relative to and movable with the caliper, whereby the caliper, cylinder, and outboard brake pad may be hydraulically moved axially relative to the carrier to engage the outboard brake pad with an outboard face of the disc and the inboard brake pad may be hydraulically moved axially relative to the caliper to engage the inboard brake pad with an inboard face of the disc upon the actuation of fluid pressure to said hydraulic cylinder and said additional pair of hydraulic cylinders.

7. The disc brake according to claim 6, characterized in that said pair of annular hydraulic seals comprise resilient annular roll-back seals whereby the caliper, cylinder, and outboard brake pad may be resiliently moved axially relative to the carrier to space the outboard brake pad from the outboard face of the disc and the inboard brake pad may be resiliently moved axially relative to the caliper to space the inboard brake pad from the inboard face of the disc upon the removal of fluid pressure from said hydraulic cylinder and said additional pair of hydraulic cylinders.

* * * * *